United States Patent [19]

Victorius

[11] 3,993,849

[45] Nov. 23, 1976

[54] METAL SUBSTRATE COATED WITH A THERMOSETTING POWDER COATING COMPOSITION OF AN ACRYLIC POLYMER, A HYDROXY FUNCTIONAL PLASTICIZER AND A BLOCKED POLYISOCYANATE CROSS-LINKING AGENT

[75] Inventor: Claus Victorius, Media, Pa.

[73] Assignee: E. I. Du Pont de Nemours and Company, Wilmington, Del.

[22] Filed: Dec. 24, 1974

[21] Appl. No.: 536,320

[52] U.S. Cl. .............................. 428/463; 260/17 R; 260/31.6; 260/77.5 CR; 260/77.5 TB; 260/901; 427/25; 427/195
[51] Int. Cl.$^2$ ................... B32B 15/08; B32B 27/22; B32B 27/30
[58] Field of Search ...... 260/31.6, 31.8 N, 77.5 CR, 260/901, 17 R, 77.5 TB; 106/193 J, 308 C; 427/25, 195

[56] References Cited
UNITED STATES PATENTS

| | | | |
|---|---|---|---|
| 2,649,382 | 8/1953 | Vesce | 106/193 J |
| 3,676,405 | 7/1972 | Labana | 260/77.5 CR |
| 3,694,389 | 9/1972 | Levy | 260/77.5 CR |
| 3,784,501 | 1/1974 | Pettit | 260/31.6 |
| 3,857,818 | 12/1974 | Frizelle | 260/77.5 CR |

*Primary Examiner*—Allan Lieberman

[57] ABSTRACT

A thermosetting polymer powder coating composition comprising finely divided powder particles that have a diameter of about 1–100 microns wherein the powder particles are a blend of A. an acrylic polymer;
   B. a blocked organic polyisocyanate;
   C. a hydroxy functional plasticizer; and
   D. a catalytic amount of an organometallic compound;

the thermosetting powder coating composition is particularly useful as an exterior finish for automobile and truck bodies.

9 Claims, No Drawings

METAL SUBSTRATE COATED WITH A THERMOSETTING POWDER COATING COMPOSITION OF AN ACRYLIC POLYMER, A HYDROXY FUNCTIONAL PLASTICIZER AND A BLOCKED POLYISOCYANATE CROSS-LINKING AGENT

BACKGROUND OF THE INVENTION

1. Field of the Invention

This invention is related to powder coating compositions and in particular, to a thermosetting polymer powder coating composition.

2. Description of the Prior Art

To curb pollution caused by conventional solvent based coating systems, the automobile and truck manufacturing industry intends to utilize powder coating compositions. However, the industry demands that these powder coating compositions be of a high quality.

Thermosetting powder coating compositions of polyester resins cross-linked with polyisocyanates are well known in the art as shown in British Pat. No. 1,265,634, published Mar. 1, 1972 and British Pat. No. 1,320,657, published June 20, 1973. In general, these polyester powder coatings do not have the high level of outdoor durability that is required for exterior use on automobile and truck bodies. Thermosetting powders of acrylic polymers cross-linked with aromatic polyisocyanates are known as shown in Labana U.S. Pat. No. 3,676,405 issued July 11, 1972, but coatings from these powders yellow and have poor exterior durability. In addition, the above thermosetting powders have other defects, such as a poor appearance, caused by inadequate flow of the finish during baking. The above defects make these compositions unacceptable for an exterior finish for automobile and truck bodies.

SUMMARY OF THE INVENTION

The thermosetting polymer powder coating composition of this invention comprises finely divided particles that have a particle size of 1–100 microns; the particles are an intimate blend of the following filmforming constituents:

A. 40–75% by weight of an acrylic polymer of
  1. methyl methacrylate, styrene or a mixture of methyl methacrylate and styrene;
  2. a hydroxyalkyl acrylate or a hydroxyalkyl methacrylate that has 2–4 carbon atoms in the alkyl groups or a mixture of the above acrylate and methacrylate;

wherein the acrylic polymer has a glass transition temperature of about 75°–103°C., a weight average molecular weight of 5,000–20,000, and a hydroxyl content of 0.5–3.0% by weight, based on the weight of the acrylic polymer;

B. 10–30% by weight of a hydroxy functional plasticizer having a hydroxyl number of 18–300 and a number average molecular weight of about 500–6,000 or a mixture of these hydroxy functional plasticizers;

C. 15–30% by weight of a blocked organic polyisocyanate of an aliphatic polyisocyanate or a cycloaliphatic polyisocyanate blocked with an organic blocking agent; and D. a catalytic amount of an organometallic compound.

DESCRIPTION OF THE INVENTION

The thermosetting powder coating composition of this invention has a glass transition temperature that provides a free-flowing powder and also has a sufficiently low melt viscosity which allows the powder to flow on baking to an exceptionally smooth, glossy finish. The finish is of high quality and has a good appearance and good physical properties as is required for the exterior finishes of automobile and truck bodies.

The thermosetting powder coating composition of this invention has powder particles that have a diameter of about 1–100 microns and preferably the powder particles are 10–75 microns in diameter to provide a high quality finish.

The particle size of the powder coating is determined by the direct measurement of the diameter of the individual powder particles under a microscope or by a Coulter Counter Instrument.

The powder particles of the powder coating can contain pigment or can be unpigmented to provide a clear finish. Generally, the powder particles are pigmented and contain up to 60% by weight, based on the weight of unpigmented powder coating, of pigment. Pigmentation can be as low as 0.1% by weight. Any of the conventional inorganic pigments, metallic powders and flakes, organic dyes, organic pigments, and lakes can be used.

About 40–75% by weight of the acrylic polymer is utilized in the powder coating composition. Also, blends of acrylic polymers can be used. The acrylic polymer has a weight average molecular weight of about 5,000 to 20,000, preferably 6,000 to 17,000, and a glass transition temperature of 75° to 103°C. and preferably 80°–102°C. and a hydroxyl content of 0.5–3.0% by weight and preferably 1.2–2.0% by weight. Acrylic polymers with the peferred molecular weight, glass transition temperature and hydroxyl content form good quality powder coatings that give excellent finishes.

The weight average molecular weight of the acrylic polymers is determined by gel permeation chromotography using polymethyl methacrylate or polystyrene as the standard.

The acrylic polymers can be prepared by conventional solution polymerization techniques in which the monomer constitutents are blended with solvents and a polymerization catalyst and the reaction mixture is heated to 55°–150°C. for about 2–6 hours to form a polymer that has the aforementioned weight average molecular weight.

Typical solvents which are used to prepare the acrylic polymers are toluene, ethyl acetate, acetone, methylisobutyl ketone, methylethyl ketone, ethyl alcohol, and other esters, ethers, ketones, and alcohols, such as are conventionally used. Solvents having a boiling point below 100°C. are preferred to facilitate spray drying of a formulated composition or solvent removal by vacuum stripping of a formulated composition to form the powder coating composition. Preparation of formulated compositions used to form powder coating composition is discussed hereinafter.

About 0.1–4% by weight, based on the weight of the monomers, of a polymerization catalyst is used to prepare the acrylic polymers. Typical catalysts are azo-bis-(α,gamma-dimethyl-valeronitrile), benzoyl peroxide, t-butyl peroxy pivalate, azobisisobutyronitrile and the like. Up to about 5% by weight of a chain transfer agent can be used to control the molecular weight such as dodecyl mercaptan or mercaptoethanol which is preferred to provide the acrylic polymer with terminal hydroxyl groups.

The acrylic polymers can be prepared by an emulsion polymerization process as disclosed in U.S. Pat. No. 3,790,513. The acrylic polymer can also be prepared by suspension or bead polymerization techniques as disclosed in W. R. Sorenson and T. W. Campbell, Preparative Methods of Polymer Chemistry, Interscience Publishers, New York, 2nd Ed. 1968, page 254.

The acrylic polymer utilized in the powder coating composition of this invention contains about 80–95% by weight of methyl methacrylate or styrene or a mixture of methyl methacrylate styrene, and 5–20% by weight of a hydroxy alkyl methacrylate or a hydroxy alkyl acrylate each having 2–4 carbon atoms in the alkyl groups or mixtures thereof. Optionally, up to 10% by weight of an alkyl methacrylate or an alkyl acrylate having 2–14 carbon atoms in the alkyl groups and can be used in the acrylic polymer.

One preferred acrylic polymer that forms a high quality powder coating composition contains 82–94% by weight of methyl methacrylate, 1–10% by weight of the alkyl methacrylate or methacrylate, 5–17% by weight of the hydroxy alkyl acrylate or methacrylate.

One particularly useful acrylic polymer that forms a durable high quality finish is of methyl methacrylate, lauryl methacrylate, hydroxyethyl acrylate, or hydroxypropyl methacrylate.

Another particularly useful acrylic polymer that forms a durable high quality finish is of methyl methacrylate and hydroxy propyl methacrylate.

Typical alkyl acrylates and alkyl methacrylates having 2–14 carbon atoms in the alkyl groups that can be used to prepare the acrylic polymer are as follows: ethyl acrylate, propyl acrylate, butyl acrylate, hexyl acrylate, 2-ethylhexyl acrylate, nonyl acrylate, decyl acrylate, lauryl acrylate, tetradecyl acrylate, ethyl methacrylate, propyl methacrylate, butyl methacrylate, isobutyl methacrylate, hexyl methacrylate, 2-ethylhexyl methacrylate, nonyl methacrylate, decyl methacrylate, lauryl methacrylate, tetradecyl methacrylate and the like.

Typical hydroxy alkyl acrylates and methacrylates which can be used to prepare the acrylic polymer are 2-hydroxyethyl acrylate, hydroxypropyl acrylate, hydroxybutyl acrylate, 2-hydroxyethyl methacrylate, hydroxypropyl methacrylate, hydroxybutyl methacrylate, and the like. Hydroxyethyl acrylate and hydroxypropyl methacrylate are preferred.

Hydroxypropyl methacrylate is a mixture of 2-hydroxypropyl methacrylate and 1-methyl-2-hydroxyethyl methacrylate. One particularly useful mixture is of 68–75% of 2-hydroxy propyl methacrylate and 1-methyl-2-hydroxyethyl methacrylate.

Hydroxypropyl acrylate is a mixture of 2-hydroxy-1 acrylate and 1-hydroxy-2-propyl acrylate.

The powder coating composition of this invention can contain in addition about 1 to 20% by weight of cellulose acetate butyrate having a viscosity of 0.005–2.0 seconds measured according to ASTM-D-1343-56 at 25°C. and a butyryl content of about 30–60% by weight. Preferably, to form a good quality finish, the cellulose acetate butyrate has a viscosity of 0.008–0.2 second and butyryl content of 50–55% and about 2–10% by weight of cellulose acetate butyrate is used. The cellulose acetate butyrate provides an excellent appearance to the finish prepared from the novel powder coating composition. The cellulose acetate butyrate is useful as a dispersant for pigments which are used in the powder coating composition.

The powder contains about 15–30% by weight of a blocked organic polyisocyanate blocked with an organic blocking agent.

A wide variety of aliphatic polyisocyanates and alicyclic polyisocyanates can be used in this invention. The following is a list of useful polyisocyanates:
propylene-1,2-diisocyanate,
butylene-1,2-diisocyanate,
butylene-1,3-diisocyanate,
hexamethylene diisocyanate,
octamethylene diisocyanate,
nonamethylene diisocyanate,
decamethylene diisocyanate,
2,11-diisocyanato-dodecane and the like,
2,2'-methylene-bis-(cyclohexyl isocyanate),
3,3'-methylene-bis-(cyclohexyl isocyanate),
4,4'-methylene-bis-(cyclohexyl isocyanate),
4,4'-ethylene-bis-(cyclohexyl isocyanate),
4,4'-propylene-bis-(cyclohexyl isocyanate),
bis-(para-isocyanato-cyclohexyl)sulfide,
bis-(para-isocyanato-cyclohexyl)sulfone,
bis-(para-isocyanato-cyclohexyl)diethyl silane,
bis-(para-isocyanato-cyclohexyl)diphenyl silane,
bis-(para-isocyanato-cyclohexyl)ethyl phosphine oxide,
bis-(para-isocyanato-cyclohexyl)phenyl phosphine oxide,
3,3'-diisocyanato adamantane,
3,3'-diisocyanato biadamantane,
3,3'-diisocyanoethyl-1,1'-biadamantane,
2,2'dimethyl propylene diisocyanate,
2,5-dimethyl heptamethylene diisocyanate,
5-methyl-nonamethylene diisocyanate,
1,4-diisocyanato-cyclohexane,
1,2-diisocyanato-octadecene,
2,5-diisocyanato-1,3,4-oxadiazole,
isophorone diisocyanate which is 3-isocyanatomethyl-3,5,5-trimethyl cyclohexyl isocyanate,

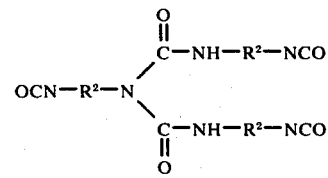

where $R^2$ is an alkylene group having 2–6 carbon atoms, wherein the preferred type is the biuret of hexamethylene diisocyanate.

As mentioned above, blocked polyisocyanates are used in the coating composition of this invention. The obvious reason for using blocked polyisocyanates is that the powder composition will remain stable and free-flowing for long periods of time since the isocyanate groups are in combination with a blocking agent and therefore will not react until sufficient heat is applied to release the blocking agent.

Any of the aforementioned polyisocyanates reacted with another chemical compound to form a thermally unstable reaction product can be utilized. This reaction product (blocked organic polyisocyanate) must be stable below 50°C. for long periods of time and must be compatible with the other constituents used in the powder coating composition. However, this product must break down under moderate baking conditions, for example, 125°–200°C. to form a polyisocyanate with reactive isocyanate groups that will cross-link with other constituents in the powder coating composition.

Typical blocking agents that can be used to form the blocked organic polyisocyanate used in the powder coating composition are, for example, phenol compounds, alkyl acetoacetates, ketoximes, dialkyl malonates, caprolactam, and the like. Typical phenol compounds that can be used are phenol, propyl phenol, tertiary butyl phenol, nonyl phenol, other monohydric phenols, bromo phenol, 2-chloro phenol, dichloro phenol, 2-methoxy nitrophenol and the like. Preferably, ketoximes are used as blocking agents for the blocked polyisocyanate used in this invention to form a high quality composition. Some referred ketoximes are, for example, acetoxime, methylethyl ketoxime, methylisobutyl ketoxime, cyclohexanone oxime and the like.

One preferred blocked polyisocyanate which forms a high quality powder coating composition is 4,4'-methylene-bis-(cyclohexyl isocyanate) blocked with methylethyl ketoxine.

The powder coating composition of this invention contains about 10–30% by weight of a hydroxy functional plasticizer or a mixture of these plasticizers. These plasticizers are cross-linked with the other constituents in the novel powder coating composition and provide a high quality finish. Typical hydroxyl containing polyesters that can be utilized have a hydroxyl number of 18–300 and a weight average molecular weight of about 500–6,000 and are polyesters of an alkylene polyol or a mixture of polyols and a dicarboxylic acid or acid mixtures such as mixtures of aliphatic or alicyclic or aromatic dicarboxylic acids. Typical polyesters are as follows: adipic acid/butanediol/ethylene glycol; phthalic anhydride/butanediol/ethylene glycol; adipic acid/neopentyl glycol/ethylene glycol; adipic acid/neopentyl glycol; adipic acid/azelaic acid/isophthalic acid/ethylene glycol; azelaic acid/isophthalic acid/ethylene glycol and trimethylol propane/phthalic anhydride/hexahydrophthalic anhydride. Hydroxyl terminated polycaprolactones can also be used as plasticizers.

In addition, about 0–6% of other non-reactive monomeric and polymeric plasticizers can be used in the novel powder coating composition of this invention. Phthalate ester plasticizers in particular the alkyl and cycloalkyl ester phthalates in which the alkyl group has 2–10 carbon atoms can be used such as diethyl phthalate, dibutyl phthalate, didecyl phthalate, butylbenzyl phthalate, dicyclohexyl phthalate, and mixtures thereof. Other esters such as tricresyl phosphate, diethyl adipate and sucrose benzoate can also be used.

Mixtures of the above polymeric platicizers and conventional monomeric plasticizers can be used.

The powder coating composition is formulated such that the molar ratio of all constituents of NCO/OH is about 0.9/1 to about 1.3/1; preferably, to form a composition which is fully reacted on curing, a ratio of 1/1 to 1.2/1 is used.

A catalytic amount of an organometallic compound is used in the powder coating composition to accelerate cross-linking and curing of the finish after application and baking. Generally, about 0.02–2.0% by weight of the organometallic compound is used. Typically useful compounds are as follows: the organo tin catalyst, such as dibutyl tin dilaurate, dibutyl tin di-2-ethylhexoate; stannous octoate, stannous oleate and the like; zinc naphthenate, cobalt naphthenate, vanadium acetyl acetonate, zirconium acetyl acetonate, acetyl acetonate titanate and the like.

A silicone resin can be added to the powder coating composition of this invention to enhance flow and reduce cratering. Any of the conventional silicone resins or oils in amounts of 0.01–2% by weight can be used for this purpose.

Generally, the powder coating is pigmented and the following are examples of the great variety of pigments which can be used in the novel powder coating composition: metallic oxide, preferably titanium dioxide, zinc oxide, iron oxide, and the like, metallic flake, such as aluminum flake, metallic powders, metal hydroxides, "Afflair" pigments, for example, mica flake coated with titanium dioxide, sulfides, sulfates, carbonates, carbon black, silica, talc, china clay, and other extender pigments, organic pigments and lakes.

Preparation of the Novel Powder Coating Composition

To prepare the novel powder coating composition of this invention, the acrylic polymer solution, emulsion or beads are blended with the blocked polyisocyanate, the hydroxy functional plasticizer and optionally, any other plasticizers and the organometallic compound along with pigments pigment dispersions, cellulose acetate butyrate and other additives such as the aforementioned silicone resin and the like. The resulting mixture is then spray dried to form a powder and the powder then can be further dried in a vacuum oven for 6–36 hours. The powder then is passed through a sieve with opening of about 100 microns but generally a 53 micron sieve is used to remove large particles.

In another technique to prepare the powder coating composition, the above prepared mixture can be charged into a vacuum extruder or mixer. The extruder is operated under a vacuum of about 22–25 inches of mercury, and a temperature of about 60° to 90°C. and any solvent or water is removed from the composition and a 100% dried product or extrudate is produces. The extrudate or dried product is then reduced to a powder using conventional grinding equipment, for example, a pin disc mill, a fluid energy mill or a hammer mill can be used. After grinding, the powder is passed through a sieve to remove large particles.

A two-roll mill is another technique that can be used to prepare the powder composition. The pigment chips or pigment dispersion, the acrylic polymer dispersion or solution, cellulose acetate butyrate, blocked polyisocyanate, plasticizer, organometallic compound and the other additives are charged into a two roll mill and milled together. The resulting composition is then ground to form the novel powder coating composition.

Optionally, about 0.1–2% by weight of finely divided silica or silane treated silica can be blended with the novel powder coating composition of this invention to improve its handling and spraying properties.

The pigment dispersions utilized in making powder coating compositions of this invention are prepared by conventional techniques such as sand grinding, pebble milling, ball milling and the like of the acrylic polymer solution or dispersion with the above pigments.

Another method for preparing a pigment dispersion is a two roll mill. It is used to prepare pigment chips which are then formed into a pigment dispersion. Generally, the pigments and the acrylic polymers or cellulose acetate butyrate along with volatile non-solvents for the polymer and plasticizer are blended together and then the mixture is placed on a two-roll mill and the mixture is thoroughly milled to disperse the pigments and form pigment chips. These chips are then blended with a solvent and additional acrylic polymers or cellulose acetate butyrate to form a pigment dispersion which is utilized as indicated above.

Application of the Powder Coating Composition

The powder coating composition of this invention is then applied to a metal, glass, plastic or fiber reinforced plastic substrate by electrostatic spraying techniques or by using a fluidized bed or an electrostatic fluidized bed. Preferably, electrostatic spraying is utilized in which a negative charge of 20 to 100 kilovolts is applied to the gun. The composition is applied in several passes and then baked at 120°–180°C. for 15–45 minutes. The resulting film is about 0.5–6 mils thick but preferably 2–3 mil thick films are used to provide a good quality finish.

Preferably, the coating composition of this invention is applied over a suitably treated and primed metal substrate or a primed and sealed metal substrate. Typical alkyd primers or epoxy primers pigmented with iron oxide, carbon black, titanium dioxide and the like can be used. Conventional epoxy sealers can also be used over the primer. The novel composition can be used directly over galvanized or phosphatized steel to form a durable coating. An electrically conductive carbon black pigment preferably is added to the primer or to the sealer to make the surface conductive and promote uniform deposition of the powder while spraying.

One useful conductive sealer which can be used is a hydroxypropyl methacrylate acrylic polymer or a methacryloxyethyl-spirocyclohexyl oxazolidine acrylic polymer and an organic plasticizer and conductive carbon black pigment in a 10/100 to 20/100 pigment to binder ratio.

Electrodeposited primers can be used on the metal substrate. Typical electrodeposited primer compositions have as the film-forming constituents about 50–95% by weight of a carboxylic acid polymer having an acid number of 5–200 and correspondingly about 5–50% by weight of a cross-linking agent.

The following are examples of carboxylic polymers used in these primer compositions; maleinized drying oils which are the reaction products of maleic anhydride and a drying oil such as linseed oil, dehydrated castor oil, tung oil, soya bean oil, and the like; alkyd resins which are the reaction products of a polyhydric alcohol and a polybasic acid such as, drying oil fatty acids; esterified epoxy resins such as, an epoxy-hydroxy polyether resin esterified with conventional drying oil fatty acid which can be further acidified with maleinized drying oils; acrylic polymers; polyesters; trimellitic anhydride alkyd resins; styrene/allyl alcohol copolymers reacted with a carboxylic acid constituent and the like. The following are typical cross-linking agents used with the above carboxylic polymers to form conventional primers and primers that can be electrodeposited: melamine formaldehyde, alkylated melamine formaldehyde, urea formaldehyde, benzoguanamine formaldehyde, toluene sulfonamide resins; one preferred cross-linking agent is hexa(methoxymethyl)-melamine. Other cross-linking agents such as, amines and other compatible hydroxyl terminated compounds can also be used.

The following Examples illustrate the invention. All quantities, percentages and ratios are on a weight basis unless otherwise indicated.

EXAMPLE 1

An acrylic polymer solution is prepared as follows:

| | Parts By Weight |
|---|---|
| Portion 1 | |
| Methyl methacrylate monomer | 265.80 |
| Lauryl methacrylate monomer | 12.75 |
| Hydroxypropyl methacrylate monomer (68–75% 2 hydroxy propyl methacrylate and 25–32% of 1-methyl-2-hydroxyethyl methacrylate) | 29.10 |
| Acetone | 129.70 |
| Portion 2 | |
| 2-Mercapto ethanol | 7.38 |
| Acetone | 8.95 |
| Portion 3 | |
| Azobisisobutyronitrile | 1.02 |
| Acetone | 4.47 |
| Portion 4 | |
| Azobisisobutyronitrile | 3.11 |
| Acetone | 62.60 |
| Portion 5 | |
| Methyl methacrylate monomer | 112.80 |
| Lauryl methacrylate monomer | 6.84 |
| Hydroxypropyl methacrylate monomer (described above) | 18.61 |
| Acetone | 4.47 |
| Portion 6 | |
| Acetone | 147.20 |
| Total | 814.80 |

Portion 1 is charged into a reaction vessel equipped with a stirrer, reflux condenser, thermometer and a heating mantle. Portion 1 is heated to its reflux temperature and held at this temperature for 5 minutes. Portion 2 is added and the resulting reaction mixture is held at its reflux temperature for 5 minutes. The reaction mixture is cooled to about 50°C. and Portion 3 is added and the temperature of the reaction mixture is controlled at 80°C. for 10 minutes. Portions 4 and 5 are premixed and added simultaneously at the following rates to the reaction mixture while holding the reaction mixture at 80°C.:

Portion 4 -

Rate 1 – 0.142 parts/minute for 110 minutes
Rate 2 – 1.0 part/minute for 50 minutes.
Portion 5 -
Rate 1 – 2.05 parts/minute for 30 minutes
Rate 2 – 0.625 parts/minute for 130 minutes.

After Portions 4 and 5 are added, the reaction mixture is held at 80°C. for 1 hour. As the reaction mixture begins to cool after heating, Portion 6 is added and the reaction mixture is cooled to room temperature.

The resulting polymer solution has a polymer solids content of 55.3% solids in which the polymer is of methyl methacrylate/lauryl methacrylate/hydroxyporpyl methacrylate in the ratio of 85/4.5/10.5. The polymer has a weight average molecular weight of 9,000 using gel permeation chromatography using polystyrene as a standard and has a glass transition temperature of 88°C. and a hydroxyl content of 1.53% by weight.

The following mill bases are prepared:

| White Mill Base | Parts By Weight |
|---|---|
| Portion 1 | |
| Acrylic polymer solution (prepared above) | 380.0 |
| Toluene | 245.0 |
| Methylethyl ketone | 75.0 |
| Portion 2 | |
| Titanium dioxide pigment | 700.0 |
| Total | 1400.0 |

Portion 1 is charged into a mixing vessel and the vessel is suspended in an ice bath. An Eppenbach Homomixer is used to mix Portion 1. Portion 2 is slowly added with constant mixing and mixing is continued for 30 minutes after Portion 2 is added. The resulting mixture is ground in a conventional sand mill at 2450 revolutions per minute for 45 minutes to form the mill base. The mill base has a solids content of 66% of which 50.77% is titanium dioxide pigment and 15.23% is acrylic polymer.

| Yellow Mill Base | Parts By Weight |
|---|---|
| Acrylic Polymer Solution (prepared above) | 180.8 |
| Toluene | 94.2 |
| Ferrite Yellow-Orange Pigment | 225.0 |
| Total | 500.0 |

The above ingredients are mixed together and charged into a sand mill and ground as above to form a mill base having a pigment content of 45% and an acrylic polymer content of 20%.

| Green Mill Base | Parts By Weight |
|---|---|
| Portion 1 | |
| Acrylic Polymer solution (50% solids of a polymer of methyl methacrylate/ lauryl methacrylate/2-hydroxyethyl acrylate in a ratio of 90.4/3.3/ 6.3 in a solvent blend of toluene/ methylethyl ketone/acetone) | 446.8 |
| Methylethyl ketone | 370.9 |
| Toluene | 196.6 |
| Ethylene glycol monoethyl ether acetate | 87.8 |
| Portion 2 | |
| Green Pigment Chip (40 mesh chip of phthalocyanine green pigment/cellulose acetate butyrate having a 55% butyryl content and 0.02 second viscosity/butyl benzyl phthalate in a ratio of 47/48/5) | 297.9 |
| Total | 1400.0 |

Portion 1 is thoroughly mixed and then Portion 2 is slowly added and mixed for 1 hour to dissolve the chips. The resulting mixture then is stirred vigorously with an Eppenbach Homomixer for one hour. Weight loss due to solvent evaporation is made up with additional solvent. The resulting mill base has a 37% solid content and is an excellent dispersion of the phthalocyanine green pigment.

| Carbon Black Mill Base | Parts By Weight |
|---|---|
| Acrylic polymer solution (described above) | 4700.4 |
| Methylethyl ketone | 3663.0 |
| Toluene | 1948.0 |
| Ethylene glycol monoethyl ether acetate | 885.0 |
| Carbon Black Chip (carbon black pigment/ polymeric dispersant*/cellulose acetate butyrate having a 55% butyryl content and a 0.02 second viscosity in a weight ratio of 20/16/64) | 2800.00 |
| Total | 13996.4 |

*Polymeric dispersant - polymer of methyl methacrylate/butyl acrylate (44/56 ratio) having a weight average molecular weight of about 5000 that is reacted with the biuret of hexamethylene diisocyanate and capped with ammonia.

The above ingredients are mixed together for about 1 hour or until the carbon black chip dissolves. The resulting mixture is passed through a conventional sand mill to form a carbon black mill base having a solids content of 40.8%.

A liquid coating composition is prepared as follows:

| | Parts By Weight |
|---|---|
| Portion 1 | |
| Dibutyl tin dilaurate solution (5% solids in toluene) | 20.0 |
| "Desmophen" 651A polyester solution* (50% solids in methylethyl ketone of hydroxy functional polyester of trimethylol propane/phthalic anhydride/hexahydrophthalic anhydride having a weight average molecular weight of about 2500 and a hydroxyl number of about 264) | 100.0 |
| Hydroxyl Terminated Polyester plasticizer solution (50% solids in methylethyl ketone of ethylene glycol/ azelate/isophthalate/adipate having a hydroxyl No. of 35 and a number average molecular weight of about 3200) | 240.0 |
| Cellulose acetate butyrate solution (40% solids in methylethyl ketone of cellulose acetate butyrate having a 55% butyryl content and a 0.02 second viscosity) | 118.3 |
| Blocked polyisocyanate solution (25% solids in methylethyl ketone/toluene of 4,4-methylene-bis-(cyclohexyl isocyanate) blocked with methylethyl ketoxime) | 760.0 |
| Acrylic Polymer solution (prepared above) | 1002.0 |
| Portion 2 | |
| White Mill Base (prepared above) | 148.1 |
| Yellow Mill Base (prepared above) | 45.6 |
| Green Mill Base (prepared above) | 8.0 |
| Carbon Black Mill Base (prepared above) | 13.1 |
| Total | 2455.1 |

*"Desmophen" 651A polyester solution - manufactured by Mobay Chemical Company.

Portion 1 is charged into a mixing vessel and thoroughly mixed together and then Portion 2 is added and thoroughly mixed with Portion 1 to form a liquid coating composition having a 38 second viscosity measured at 25°C. with a No. 1 Zahn Cup. About 0.25% by weight based on the weight of the film-forming constituents in the above composition, of a low molecular weight silicone oil (Union Carbide's L-522 silicone) is added to the above composition and blended into the composition along with 0.50% by weight, on the same basis, of solution of a 50% solids in xylene of a silicone oil (Byk 300 made by Byk-Mallinckrodt).

The weight ratio of acrylic polymer/hydroxy polyester/blocked polyisocyanate/cellulose acetate butyrate in the above composition if 59/17/19/5.

This composition is spray dried by spraying the composition with a suction type gun at 80 pounds per square inch pressure into a 50-gallon drum that is open at both ends and placed in a horizontal position. One end of the drum is covered with a 140 mesh nylon cloth to retain the powder particles and the other end of the drum with polyethylene having one opening therein through which the powder is sprayed. The powder is then placed into a vacuum oven at 34°C. and then dried for about 64 hours. The powder then is passed through a 270 mesh screen. The resulting powder is non-sticky even after being exposed to 35°C for 1 week.

The powder is then sprayed onto a 20 guage phosphatized steel panel sealed with a conductive sealer of an acrylic polymer pigmented with carbon black pigment. A model 322 Ransburg electrostatic powder gun is used to apply the powder to the panel then is prebaked for 10 minutes at 120°C., 20 minutes at 143°C. and 45 minutes at 162°C.

The coating on the panel is about 2.4 mils thick, has a 20° gloss of about 80, a distinctness image of about 5+ where 5 or above is considered an acceptable rating, an EASFT* of 64°C. of Tukon hardness of 12.6 knoops. In general, the coating is free of craters, surface pits and has no indication that the coating popped during baking and has an acceptable appearance. Chip and cold crack resistance and outdoor weatherability of the coating are acceptable.

*EASFT - Egg albumin spot free temperature - is the highest temperature at which a standard aqueous solution of egg albumin does not distort the coating after being dried. The coated panel being tested is placed on a thermal gradient bar for 6 minutes and then washed with water and examined for distortion of the coating. The lowest temperature at which the coating is free of distortion is recorded at the EASFT temperature.

EXAMPLE 2

The following mill bases are prepared:

| White Mill Base | Parts By Weight |
|---|---|
| Acrylic polymer solution (50% solids solution of a copolymer of methyl methacrylate/lauryl methacrylate/ hydroxyethyl acrylate in a weight ratio of 90.4/3.3/6.3 having a weight average molecular weight of about 17,000, and a glass transition temperature of 83 °C. and a hydroxyl content of 1.1%, in a solvent mixture of toluene/methylethyl ketone/acetone) | 125.0 |
| Titanium dioxide pigment | 125.0 |
| Toluene | 30.0 |
| Methylethyl ketone | 15.0 |
| Total | 295.0 |

The above ingredients are thoroughly mixed together and then ground in a conventional sand mill to form a mill base having a solids content of 67 percent, containing 22.3 percent pigment, and 44.7 percent polymer.

| Black Mill Base | Parts By Weight |
|---|---|
| Acrylic polymer solution (described above) | 470.4 |
| Methylethyl ketone | 366.3 |
| Toluene | 194.8 |
| Ethylene glycol monoethyl ether acetate | 88.5 |
| Carbon black chips (prepared on a two-roll mill and ground to a No. 40 mesh size of carbon black/ cellulose acetate butyrate, having a 0.02 second viscosity and a 55% butyryl content/polymeric dispersant* in a weight ratio of 20/64/16) | 280.0 |
| Total | 1,400.0 |

The above ingredients are blended together and stirred for 1 hour to dissolve the pigment chips, then the mixture is stirred vigorously with an Eppenbach Homomixer for 1 hour. The weight loss due to the solvent evaporation is made up with additional solvent. The resulting 36.8% solids mill base is an excellent dispersion of the carbon black pigment.

| Yellow Mill Base | Parts By Weight |
|---|---|
| Acrylic polymer solution (described above) | 383.0 |
| Methylethyl ketone | 317.9 |
| Toluene | 168.5 |
| Ethylene glycol monoethyl ether acetate | 75.3 |
| Irgazin yellow chips (Irgazin yellow pigment/cellulose acetate butyrate having a 0.02 second viscosity and a 55% butyryl content/butylbenzyl phthalate in a weight ratio of 47/48/5, two roll chips milled 25 minutes on a two-roll machine and ground to a No. 40 mesh size) | 255.3 |
| Total | 1,200.0 |

*Polymeric dispersant - described in Example 1.

The above ingredients are thoroughly blended together and agitated as above giving about a 37% solids mill base that is a good dispersion of the Irgazin yellow pigment.

Phthalocyanine Green Mill Base

The phthalocyanine green pigment/cellulose acetate butyrate, 55% butyryl content and 0.02 second viscosity/butylbenzyl phthalate (47/48/5), two roll chip is prepared and ground to a No. 40 mesh size, and then blended as above with the acrylic polymer solution, toluene, methylethyl ketone, and ethylene glycol monoethyl ether acetate to from about a 37% solids mill base, having an excellent dispersion of the phthalocyanine green pigment.

A liquid coating composition was prepared as follows:

| | Parts By Weight |
|---|---|
| Portion 1 | |
| Blocked polyisocyanate solution (40% solution in xylene/ethylene glycol monoethyl ether acetate of an aliphatic diisocyanate blocked with methylethyl ketoxime | 65.0 |
| Didecyl phthalate | 6.0 |
| Dibutyl tin dilaurate solution (4% solids solution in toluene) | 6.5 |
| Silicone solution (50% solids solution in toluene of a low molecular weight silicone resin) | 1.2 |
| Polycaprolactone solution (50% solids solution of a hydroxy terminated polycaprolactone having a weight average molecular weight of about 1250 dissolved in methylethyl ketone solvent) | 24.0 |
| Cellulose acetate butyrate solution (40% solids solution of cellulose acetate butyrate having a 55% butyryl content and a 0.02 second viscosity in a solvent mixture of | |

-continued

| | Parts By Weight |
|---|---|
| methylethyl ketone/toluene in a 1/1 ratio) | 49.5 |
| Acrylic polymer solution (described above | 215.5 |
| Portion 2 | |

| White Mill Base (prepared above) | 2.0 |
|---|---|
| Black Mill Base (prepared above) | 27.5 |
| Yellow Mill Base (prepared above) | 39.0 |
| Green Mill Base (prepared above) | 31.8 |
| Portion 3 | |
| Acetone | 160.0 |
| Total | 627.5 |

Portion 1 is charged into a mixing vessel and thoroughly mixed, then Portion 2 is added and thoroughly mixed. Portion 3 is added to thin the composition to a 38 second viscosity measured in a No. 1 Zahn Cup at 25°C. The composition then is sprayed dried as in Example 1 and dried in a vacuum oven at 30°C. for 12 hours and passed through a 270 mesh sieve to form a poder coating composition which is stable at room temperature.

The weight ratio of acrylic polymer/hydroxyl polyester/blocked polyisocyanate/cellulose acetate butyrate/didecyl phthalate is 63/13/15/6/3.

Two aluminum panels are electrostatically coated with the powder and baked for 20 minutes at 150°C. and for 30 minutes at 165°C.

The panels have the following properties:

| | Panel 1 | Panel 2 |
|---|---|---|
| Coating Thickness (Mils) | 2.6 | 3.0 |
| 20° Gloss | 74 | 79 |
| Appearance | Acceptable appearance, some very fine surface pitting | Acceptable appearance, considerable very fine surface pitting |
| Distinctness of Image | 4+ | 4+ |
| Tukon Hardness | — | 12 |

In general, finishes of the above powder have acceptable appearance, gloss, hardness and distinctness of image.

EXAMPLE 3

The following liquid coating compositions are prepared:

| | Parts By Weight | |
|---|---|---|
| | Composition A | Composition B |
| Silicone Solution (50% solids in toluene of a low molecular weight silicone oil L-522) | 0.6 | 0.6 |
| Silicone Solution (50% solids in ethylene glycol monobutyl ether of a low molecular weight silicone Byk 300) | 0.6 | 0.6 |
| Dibutyl tin dilaurate solution (5% solids in toluene) | 2.4 | 2.4 |
| Hydroxyl terminated polyester plasticizer solution (described in Example 1) | 36.0 | 24.0 |
| "Desmophen" 651A Polyester solution (described in Example 1) | 12.0 | 12.0 |
| Blocked polyisocyanate solution (75% solids in methylethyl ketone of isophorone diisocyanate blocked with methylethyl ketoxime) | 28.8 | — |
| Blocked polyisocyanate solution (48.9% solids in methylethyl ketone of 4,4-methylene-bis-(cyclohexyl isocyanate) blocked with methyl isobutyl ketoxime) | — | 52.8 |
| Cellulose Acetate Butyrate solution (described in Example 1) | 15.0 | 15.0 |
| Acrylic Polymer solution (described in Example 1) | 136.8 | 140.4 |
| Total | 232.2 | 247.8 |

The above constituents are thoroughly blended together and each composition has a 38 second viscosity using a No. 1 Zahn Cup measured at 25°C.

In Composition A, the weight ratio of acrylic polymer/hydroxyll polyester/blocked polyisocyanate/cellulose acetate butyrate is 57/20/18/5; in Composition B, the ratio is 58.5/15/21.5/5. The compositions are then spray dried as in Example 1 and dried in a vacuum oven at 37°C. for 72 hours. The resulting powders were each blended with about 0.1% by eight of hydrophobic fumed silica and passed through a 270 mesh sieve.

Powder Compositions A and B are each sprayed onto phosphatized steel panels having a conductive sealer coat using the same equipment and procedure described in Example 1. Each panel is baked following the procedure of Example 1.

The panels have the following properties:

| | Powder Composition A | Powder Composition B |
|---|---|---|
| Film Thickness | 2.3 mils | 2.5 mils |
| 20° Gloss | 82 | 83 |
| Distinctness of Image | 6+ | 6+ |
| Tukon Hardness | 10.1 Knoops | 12.4 Knoops |
| EASFT °C. (Defined in Example 1) | 50° C. | 56° C. |
| Appearance | Acceptable | Acceptable |

The finishes on the panels have good weatherability, solvent and mar resistance.

EXAMPLE 4

The following liquid coating composition is prepared:

|  | Parts By Weight |
|---|---|
| Silicone solution (50% solids in xylene of a low molecular weight silicone Byk 300) | 0.80 |
| Silicone solution (50% solids in toluene of a low molecular weight silicone oil L-522) | 0.80 |
| Dibutyl tin dilaurate solution (5% solution in toluene) | 4.00 |
| Hydroxyl terminated polyester plasticizer solution (described in Example 1) | 64.00 |
| Cellulose acetate butyrate solution* | 37.40 |
| Blocked isocyanate solution [32% solids in acetone of 4,4'-methylene-bis-(cyclohexyl isocyanate) blocked with methylethyl ketoxime] | 118.80 |
| Acrylic polymer solution (57.4% solids in methylethyl ketone/acetone of a polymer of methyl methacrylate/hydroxy propyl methacrylate, 88/12 ratio in which the polymer has a weight average molecular weight of 6800 and a glass transition temperature of 101 ° C. and a hydroxyl content of 1.72%) | 196.10 |
| Green Mill Base (Described in Example 1) | 1.85 |
| Carbon Black Mill Base (described in Example 1) | 3.25 |
| Yellow Mill Base (described in Example 1) | 8.20 |
| White Mill Base (described in Example 1) | 31.50 |
| Acetone | 21.30 |
| Total | 488.00 |

*40% solids in methylethyl ketone of cellulose acetate butyrate having a 53% butyryl content and a 0.008 second viscosity.

The above constituents are thoroughly blended together and the resulting composition has a 40 second spray viscosity measured using a No. 1 Zahn Cup at 25°C. The compositions are then spray dried and placed in a vacuum oven at 30°C. for 12 hours. The resulting powder coating composition contains acrylic polymer/hydroxy terminated polyester/blocked polyisocyanate/cellulose acetate butyrate in a weight ratio of 60/16/19/5.

The powder composition is sprayed onto phosphatized steel panels primed with an alkyd automotive primer and sealed with a conductive sealer and baked for 15 minutes at 143°C. and for 40 minutes at 163°C.

The panels have the following physical properties:

| Film thickness | 2.3 mils |
|---|---|
| 20° gloss | 82 mils |
| Distinctness of Image | 5+ |
| EASFT (described in Example 1) | 59° C. |
| Hardness | 14.6 Knopps |

The finishes on the panels have good weatherability, chip, solvent, and cold crack resistance.

The invention claimed is:

1. A metal substrate coated with a smooth, even coalesced layer of a thermosetting polymer powder coating composition comprising a blend of constituents consisting essentially of about
    A. 40–75% by weight of at least one acrylic polymer consisting essentially of about
        1. 80–95% by weight of methyl methacrylate, styrene or a mixture of methyl methacrylate and styrene;
        2. 0–10% by weight of an alkyl methacrylate or an alkyl acrylate having 2–14 carbon atoms in the alkyl groups;
        3. 5–20% by weight of a hydroxy alkyl methacrylate, a hydroxy alkyl acrylate each having 2–4 carbon atoms in the alkyl groups or a mixture of said hydroxy alkyl methacrylate and said hydroxy alkyl acrylate; and
    wherein the acrylic polymer has a weight average molecular weight of about 5,000–20,000, a glass transition temperature of 75°–103°C. and a hydroxyl content of 0.5–3% by weight, based on the weight of the acrylic polymer;
    B. 10–30% by weight of a hydroxy functional polyester plasticizer having a hydroxyl number of about 18–300 and a number average molecular weight of about 500–6,000 or a mixture of these hydroxy functional polyester plasticizers; wherein these functional plasticizers are polyesters of an alkylene glycol or mixtures of alkylene glycols and an aliphatic, alicyclic or aromatic dicarboxylic acid or a mixture of these acids;
    C. 15–30% by weight of a blocked polyisocyanate of an aliphatic polyisocyanate or a cycloaliphatic polyisocyanate blocked with an organic blocking agent; wherein the blocked polyisocyanate is stable below 50°C and breaks down under moderate baking conditions to provide reactive isocyanate groups; and
    D. a catalytic amount of an organo metallic compound;
wherein the molar ratio of NCO/OH for all of the above constituents is about 0.9/1 to about 1:3/1.

2. The metal substrate of claim 1 in which the coating composition contains in addition about 0.1–60% by weight, based on the weight of the constituents, of pigment.

3. The metal substrate of claim 1 in which the acrylic polymer of the coating composition consists essentially of about 82–94% by weight of methyl methacrylate, 1–10% by weight of an alkyl acrylate or an alkyl methacrylate each having 2–14 carbon atoms in the alkyl groups and 5–17% by weight of a hydroxy alkyl methacrylate or a hydroxy alkyl acrylate having 2–4 carbon atoms in the alkyl groups and in which the acrylic polymer has a weight average molecular weight of about 6,000–17,000 and a glass transition temperature of 80°–102°C.

4. The metal substrate of claim 1 in which the acrylic polymer of the coating composition consists essentially of about 80–95% by weight of methyl methacrylate and 5–20% by weight of a hydroxy alkyl acrylate or a hydroxy alkyl methacrylate having 2–4 carbon atoms in the alkyl groups and in which the acrylic polymer has a weight average molecular weight of about 6,000–17,000 and a glass transition temperature of about 80° to 102°C.

5. The metal substrate of claim 1 in which the coating composition contains in addition 1–20% by weight, based on the weight of the constituents, of cellulose acetate butyrate that has a butyryl content of about 30–60% and a viscosity of about 0.005–2.0 seconds measured at 25°C. according to ASTM-D-1343-56.

6. The metal substrate of claim 1 in which the coating composition contains about 0.02–2.0% by weight, of an organic tin catalyst.

7. The metal substrate of claim 1 in which the acrylic polymer of the coating composition consisting essentially of about 82–94% by weight of methyl methacrylate, 1–10% by weight of an alkyl acrylate or an alkyl methacrylate having 2–14 carbon atoms in the alkyl groups, 5–17% by weight of a hydroxy alkyl acrylate or a hydroxy alkyl methacrylate having 2–4 carbon atoms in the alkyl groups; and wherein the acrylic polymer has a weight average molecular weight of 6,000–17,000 and a glass transition temperature of 80°–102°C.

8. The metal substrate of claim 2 in which the coating composition comprises
  A. an acrylic polymer consists essentially of methyl methacrylate, lauryl methacrylate, hydroxyethyl acrylate;
  B. a hydroxy functional plasticizer of a mixture of hydroxy terminated polyesters of ethylene glycol/azelaic acid/isophthalic acid/adipic acid and trimethylol propane/phthalic anhydride/hexahydro phthalic anhydride;
  C. a blocked organic polyisocyanate of 4,4'-methylene-bis-(cyclohexyl isocyanate) blocked with methylethyl ketoxime; and
  D. a catalyst of dibutyl tin dilaurate; and contains in addition about 2 to 10% by weight of cellulose acetate butyrate that has a butyl content of about 55% and a viscosity of abot 0.02 seconds.

9. The metal substrate of claim 2 in which
  A. the acrylic polymer consists essentially of methyl methacrylate and hydroxy propyl methacrylate;
  B. the hydroxy functional plasticizer is a hydroxy polyester of ethylene glycol/azelaic acid/isophthalic acid/adipic acid; and
  C. the blocked organic polyisocyanate is 4,4'-methylene-bis-(cyclohexyl isocyanate) blocked with methylethyl ketoxime; and
  D. the catalyst is dibutyl tin dilaurate; and contains in addition about 2 to 10% by weight of cellulose acetate butyrate having a butyryl content of about 55% and a viscosity of about 0.02 seconds.

* * * * *